United States Patent [19]

Pietz et al.

[11] 4,197,213

[45] Apr. 8, 1980

[54] METHOD AND APPARATUS FOR THE PYROTECHNIC GENERATION OF MULTI-COMPONENT GASES

[75] Inventors: John F. Pietz, Mesa; Melvin E. Steinle, Scottsdale, both of Ariz.

[73] Assignee: Talley Industries of Arizona, Inc., Mesa, Ariz.

[21] Appl. No.: 882,051

[22] Filed: Feb. 28, 1978

[51] Int. Cl.² ............ A62B 7/08; B01J 7/00; C09K 3/00
[52] U.S. Cl. ............... 252/372; 128/202.26; 169/30; 169/46; 252/188.3 R; 422/120; 422/164; 422/165; 424/366; 431/270
[58] Field of Search ........ 23/281; 128/191 R, 142 R, 128/142 G; 252/372, 188.3 R; 424/366; 169/30, 46; 422/120, 164, 165

[56] References Cited

U.S. PATENT DOCUMENTS

| | | | |
|---|---|---|---|
| 2,558,756 | 7/1951 | Jackson et al. | 23/281 |
| 3,767,366 | 10/1973 | Staub, Jr. | 23/281 |
| 3,797,854 | 3/1974 | Poole et al. | 23/281 X |
| 3,931,040 | 1/1976 | Breazeale | 252/372 X |
| 3,955,931 | 5/1976 | Thompson | 23/281 |

Primary Examiner—Joseph Scovronek
Attorney, Agent, or Firm—Pennie & Edmonds

[57] ABSTRACT

A method and apparatus are disclosed for pyrotechnically generating a mixture of at least two gases, substantially in a predetermined ratio, for an extended period of time, with separate pyrotechnic charges generating each component of the resultant mixture. At least one of the pyrotechnic charges is capable of sustained burning at a rate corresponding to the rate of total gas generation, and the remaining charges, not in themselves capable of sustained burning, are caused to sustain ignition by maintaining their burning surface in thermal communication with that of the first charge, so that all charges burn at substantially the same linear rate.

18 Claims, 3 Drawing Figures

METHOD AND APPARATUS FOR THE PYROTECHNIC GENERATION OF MULTI-COMPONENT GASES

BACKGROUND OF THE INVENTION

This invention relates broadly to the pyrotechnic generation of mixtures of gases, and in particular to the generation of a breathable mixture of oxygen and nitrogen useful as a substitute for air. It is highly useful as a compact safety device for providing a breathable mixture for emergency use in smoke or other noxious or toxic environments. It is particularly advantageous where the proximity or threat of fire precludes the use of pure oxygen, and it provides a breathable mixture for a sufficiently long period, on the order of fifteen minutes or more, to substantially improve the user's chances of escape.

Pyrotechnic charges, commonly referred to as candles, have long been available for generating single gases for a variety of purposes. For example, oxygen candles, which generally employ sodium chlorate or potassium perchlorate, are commercially available for emergency use where the air supply is limited or contaminated. These devices generally supply the oxygen for breathing through a mask. However, such devices generate substantially pure oxygen which cannot safely be used in the presence of fire or imminent explosion.

There also exist devices employing multiple pyrotechnic compositions for generating mixtures of gases over fleetingly brief time periods—so brief that matching the reaction rates of the respective compositions and hence the rates at which they generate the components of the resultant mixture is not a problem. For example, U.S. Pat. No. 3,797,854 issued Mar. 19, 1974, to Rocket Research Corporation, discloses an apparatus for generating a breathable mixture of nitrogen and oxygen to inflate an air cushion in an automotive crash restraint system. The nitrogen and oxygen are generated by separate compositions, the ignition of which are synchronized by allowing the nitrogen-producing reaction to initiate the oxygen-producing reaction. Both reactions proceed at their own rates to generate large volumes of gas in a small fraction of a second so as to rapidly inflate the air cushion. Because both compositions must react completely in a very brief time period, only the ratio of the total volumes of the two gases need be controlled, and not the respective reaction rates.

It is important for breathing purposes that the average ratio between the oxygen and nitrogen produced be relatively constant over periods of, say, 15–30 seconds. Although some variation in the reaction rates may be tolerated for brief periods of time, significant departures from the average rates over longer time periods would produce atmospheres either too lacking in oxygen to be breathable, or so rich in oxygen as to create a significant fire and explosion hazard.

It has not been possible with known pyrotechnic compositions for generating these two gases to provide separate oxygen and nitrogen candles capable of producing breathable air in accordance with those criteria and in a practical manner. Although control of burn rates becomes easier as the rates themselves are increased, the use of separate candles operating at relatively high burn rates would require such a large volume of propellant as to be wholly impractical, and would generate unnecessarily large volumes of gas. If the oxygen and nitrogen generating compositions are intimately mixed in order to match their burning rates, in an attempt to achieve lower rates, unstable and potentially explosive compounds may result.

In order to provide a workable and practical gas generator for these purposes, the burn rates of the respective candles should be no more than a few inches per minute, preferably between about one-half and one inch per minute. Although conventional oxygen candles can be made to sustain combustion at these relatively low rates, no nitrogen generating composition has been found which is capable of sustaining combustion at under several times such rates on a reliable basis. For that reason, all practical emergency sources of breathable air presently in commercial or military use employ cannisters of compressed air, or compressed nitrogen and oxygen, the ratio of which is controlled by valving upon their release from storage. The relatively large volumes required to store such gases, even under pressure, are such that available units are generally limited to about five minutes of use.

SUMMARY OF THE INVENTION

In accordance with the present invention, separate pyrotechnic charges are provided for generating each of the component gases. The charges are maintained in close proximity, and are such that at least one of them is capable of sustained combustion at the desired rate. The remaining charge or charges are incapable of sustained combustion, and require additional heat to keep them burning, which heat is provided by the combustion of the first-mentioned charge. In this manner, the separate charges can be controlled to burn at essentially the same linear rate, controlled by the burn rate of the self-sustaining charge.

In accordance with a preferred embodiment of the invention, compressed charges of oxygen-generating and nitrogen-generating compositions are provided in concentric tubular cavities, the oxygen candle having a burn rate of approximately 0.5 inches per minute. The cavities are formed of metal, affording adequate heat transfer so that the linear burn rates of the compositions are essentially equal. If the two charges, each of which is compressed to a high density in order to promote even combustion, produce their respective gases at volumetric rates $K_1$ and $K_2$ at such densities, then the volumetric gas ratio R of the gas produced by charge 1 to that produced by charge 2 will be equal to $$(K_1/K_2) \times (A_1/A_2)$$

where $A_1$ and $A_2$ are the respective corresponding cross-sectional areas of the charges.

Either the oxygen or the nitrogen generating charge can be placed in the central volume, the other being placed in the concentric cavity surrounding it.

Alternatively, a series of concentric volumes may be provided containing alternating charges of nitrogen and oxygen generating composition, the total cross-sectional areas of each being related to the resultant mixture in accordance with the above-mentioned formula. Any other geometries may be employed consistent with the foregoing criteria; however, the use of concentric volumes has been found preferable as it best assures adequate heat transfer to the non-self-sustaining charge.

If a gaseous mixture is to be generated having three or more components, the concentric arrangement described above may be employed with, for example, one concentric layer of each of the several charges. Preferably, one of the charges, the burn rate of which is most readily controllable, is made self-sustaining while the remaining charges require thermal input from the self-sustaining charge in order to maintain combustion. Alternatively, if two components of the multicomponent mixture are generated by self-sustaining charges the burn rates of which can be closely controlled, such two self-sustaining charges may be employed with the remaining charges being non-self-sustaining.

Inasmuch as some solid residue is produced during combustion of the charges, a common chamber is preferably provided at the output of the generator for filtering out such constituents as well as to allow mixing of the several components. Generators in accordance with the present invention may be operated at ambient pressure without the necessity of heavy structural components required for high pressure operation. Preferably, a filter with a pore size of the order of 10 microns or less is provided in the output filtering chamber, resulting in adequate filtering while producing internal pressures of only a few pounds per square inch.

DESCRIPTION OF THE DRAWINGS

The invention will be further illustrated by preferred embodiments as shown in the annexed drawings, in which.

For convenience of reference, the same structural elements are represented by the same reference numerals throughout the drawings.

DETAILED DESCRIPTION OF PREFERRED EMBODIMENTS OF THE INVENTION

Figure 1:
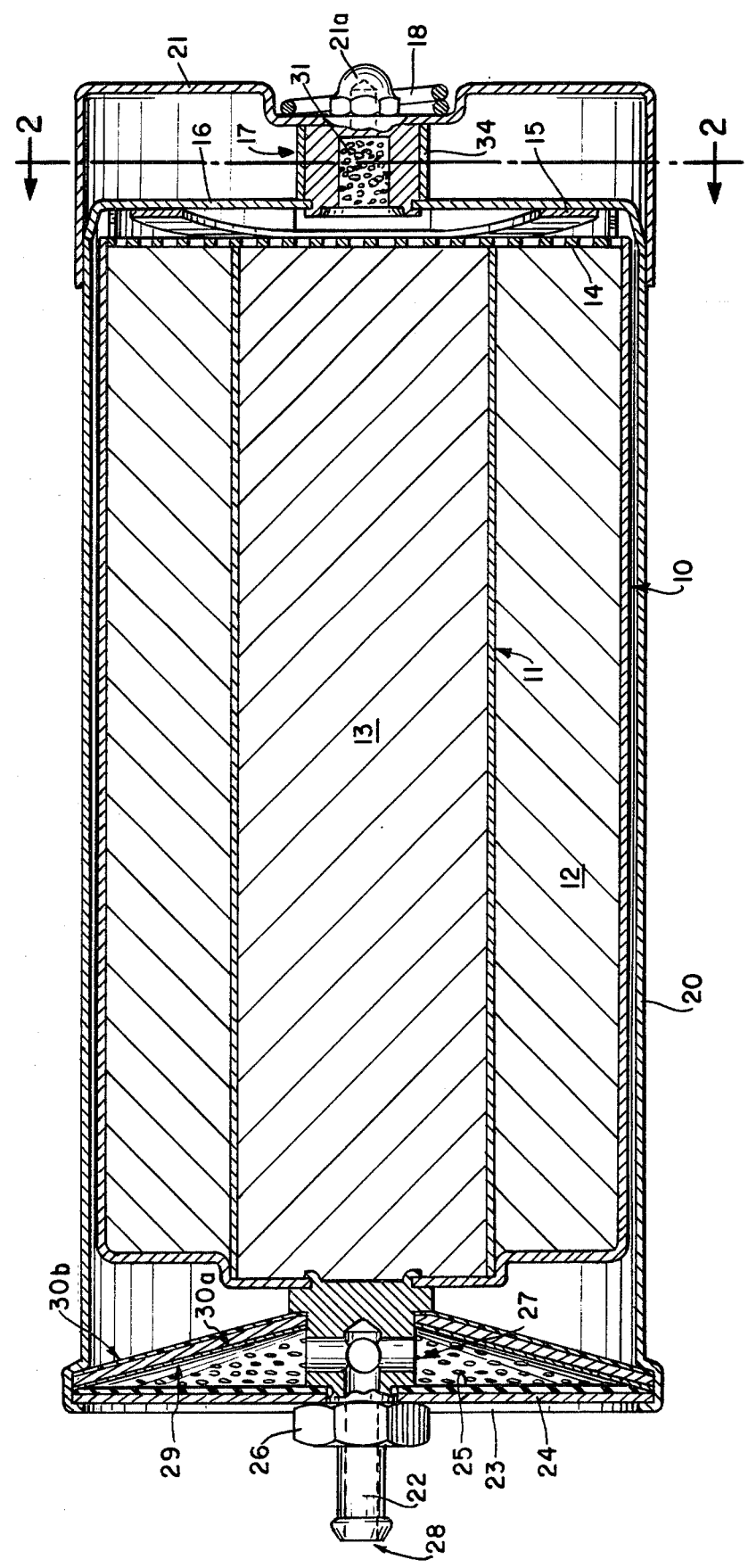
FIG. 1 is a sectional view of a gas generator in accordance with the invention.
Figure 2:
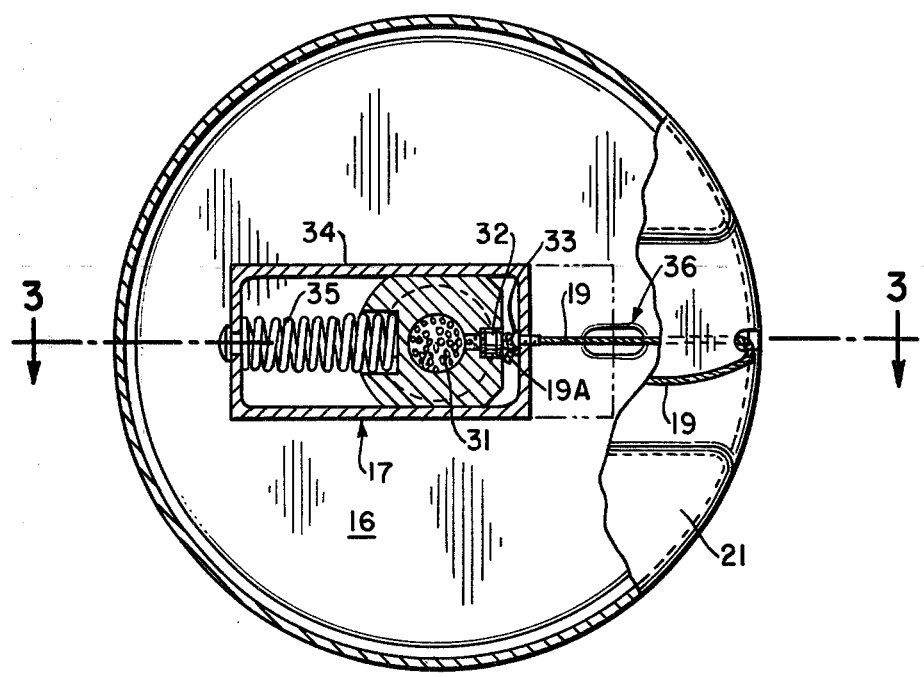
FIG. 2 is an end view of the gas generator of FIG. 1.

In accordance with a preferred embodiment of the invention, briefly referred to above and shown in FIGS. 1 and 2 herein, there is provided a cannister 10, generally cylindrical, containing an inner cylindrical wall 11, the outer cannister wall and the inner wall 11 containing respective concentric pressed charges of nitrogen-generating and oxygen-generating compositions 12 and 13. The right-hand wall of charges 12 and 13, as illustrated in FIG. 1, abuts a perforated metal plate 14, held in place by a leaf spring washer 15 acting against wall 16 of an outer shell, described below. The burning surfaces of charges 12 and 13 are at the right end of the cannister adjacent plate 14, and the oxygen candle is ignited by an igniter assembly 17 actuable by pulling a ring 18 at the end of a lanyard 19.

Cannister 10 and inner wall 11, as well as the remaining structural walls to be described, are preferably formed of a low carbon steel of the order of 40 to 60 mils thick, preferably about 40 mils thick for inner wall 11. Any material which has the requisite workability to be compatible with conventional manufacturing processes, which will withstand the temperatures involved and which does not contribute any unacceptable toxic gases may alternatively be used. Inner wall 11 must in addition allow adequate heat transfer so that the non-self-sustaining charge derives enough heat from the self-sustaining charge to continue burning.

An exterior shell 20 is provided concentrically about cannister 10, forming an end surface 16 against which spring 15 is compressed to hold plate 14 in place. The portion of the wall of cannister 10 extending between plate 14 and surface 16 is partially cut away or slotted, as shown, to permit free flow of the gases generated into the annular space between cannister 10 and shell 20. An additional generally cylindrical base member 21, held in place by a nut 21a fastened to igniter 17, provides additional thermal shielding and protection in the vicinity of the hottest parts of the unit, the igniter and the end surface 16 exposed to the burn surfaces of the charges. The top, or left, end of cannister 10 carries a centrally mounted gas outlet fixture 22 (which may be fastened to cannister 10 by any conventional manufacturing technique), and a filter and closure element 23 is fastened between outlet fixture 22 and the side wall of cannister 20.

Filter and closure element 23 includes an annular cap 24 backed by a flexible sealing disc 25, which engage outlet fixture 22 against a shoulder provided thereon and are held against the shoulder by a nut 26. The free end of cannister 20 may be crimped about the exterior of disc 24 to effect a seal.

Outlet fixture 22 includes a plurality of inlet ports 27 and an outlet port 28. Filter and closure element 23 further includes a perforate, essentially rigid filter retainer 29, and a filter element supported thereon comprised of two filter elements 30a and 30b, supported at their periphery by the wall of cannister 20 as shown in FIG. 1, and supported at their inner circumference by a shoulder on outlet fixture 22. Filter retainer 29, which may be a wire screen, provides a relatively rigid support for filters 30a and 30b and permits the free flow of gas through it. Filter element 30a may be formed of porous high density polyethylene with a pore size between 50 and a few hundred microns, and filter element 30b may, for example, be a cellulose acetate membrane about 0.02 inches thick with a pore size of a few microns. A 10 micron pore size has been found to produce a satisfactorily clean gas output, and a pore size of the order of one micron does not unduly increase the internal operating pressure of the unit to unacceptable levels such as might require additional structural elements to maintain the rigidity of the unit. In this embodiment, filtration is accomplished essentially by the cellulose acetate layer 30b, the relatively large-pore layer 30a serving to support the former against extrusion through support 29. The filter must also be capable of withstanding the output gas temperatures, generally of the order of a few hundred degrees Fahrenheit. Alternatively, the filter element may be made of sintered metal, screen or mesh, porous paper or any other suitable material.

The above-described structure forms a gas output path which promotes a maximum amount of mixing and cooling of the output gases in a relatively small volume before they leave the generator. The gases flow through perforated plate 14 into the chamber formed generally between that plate and interior wall 16 of shell 20, through the annular volume between cannisters 10 and 20, and through filter elements 30a and 30b and inlet port 27 to outlet port 28 of fixture 22.

Figure 3:
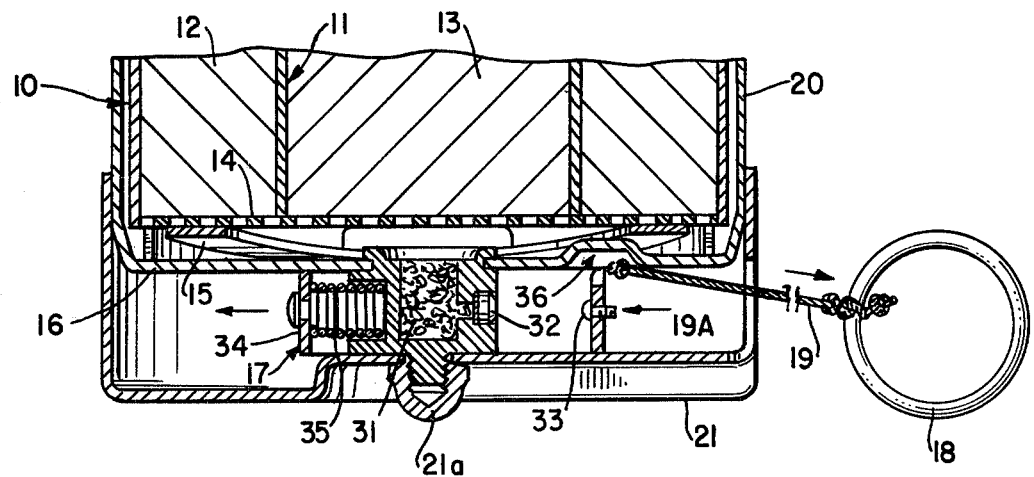
FIG. 3 is a partial cross section of the gas generator of FIG. 1 illustrating the operation of a preferred igniter system.

Any conventional igniter system may be used, preferably one which is not internally spring loaded except upon actuation, for enhanced safety. A preferred igniter system is illustrated in FIGS. 2 and 3. Here a quantity of igniter material 31 is disposed adjacent a primer 32. A firing pin 33 is disposed on a movable subassembly 34 in alignment with the primer and a compression spring 35 is provided for actuating the subassembly and the pin. Lanyard 19 is coupled to subassembly 34 via knot 19a and dimple 36 is provided in wall 16 for decoupling the lanyard and the subassembly by permitting the knot to release.

In actuation, the pulling of ring 18 initially moves subassembly 34 and, thus, compresses spring 35. Upon sufficient movement, knot 19a enters into the region of dimple 36, releasing subassembly 34. The action of spring 35 snaps the subassembly back towards its original position and drives firing pin 33 into primer 32. Primer 32 ignites material 31.

The igniter material is preferably a charge similar to the self-sustaining candle but with a higher burn rate. Alternatively, it can be any other non-toxic igniter capable of providing an appropriate ignition temperature for the propellant constituents utilized, typically of the order of about 850° F.

It will be understood that a wide variety of conventional oxygen candle compositions may be employed within the scope of the invention, provided only that the oxygen meets the purity requirements of the particular application and that the burn rate can be made low enough, preferably of the order of less than about one-half inches per minute. A preferred self-sustaining oxygen generating composition comprises 4% barium peroxide, 11% finely divided iron powder, and 85% sodium chlorate. In addition, oxygen candles of this composition can include a few percent of silica or fiberglass.

With the preferred oxygen candle composition given above, a suitable primer composition is as follows:

| Constituents | Weight Percent |
| --- | --- |
| Barium Peroxide | 27% |
| Iron Powder | 40% |
| Sodium Chlorate | 33% |

Nitrogen generating compositions in accordance with the invention preferably include between about 35% and 60% sodium azide; from about 0.3% to about 1.5% iron oxide; between about 0.3% and 1.5% alumina; between about 0% and 2% carbon black; and the balance, finely divided silicon dioxide in the range between about 35% and 65%.

A preferred nitrogen generating composition in accordance with the invention comprises 45% sodium azide; 0.5% ferric or ferrous oxide; 0.5% alumina, or aluminum hydroxide; 1.0% carbon black, and the balance, finely divided silicon dioxide. The iron oxide is preferably a compound commercially available under the designation "iron yellow" or the brand name "Mapico Yellow," a trademark of Cities Service Corporation. The alumina is preferably $Al_2O_3 \cdot H_2O$, and the silicon dioxide is preferably fine silica flour, 99% pure or higher, with a particle size preferably under 40 microns.

While the invention has been described in connection with a small number of specific embodiments, it is to be understood that these are merely illustrative of the many other specific embodiments which also utilize the principles of the invention. For example, while oxygen and nitrogen candles were provided to generate breathable air, it is also clear that carbon dioxide and nitrogen candles could have been alternatively provided to generate a non-breathable mixture of gases for extinguishing fire. Thus, numerous and varied devices can be made by those skilled in the art without departing from the spirit and scope of the present invention.

I claim:

1. A pyrotechnic gas generator for generating a mixture of at least two gases substantially in a predetermined ratio, comprising:
   a plurality of separate pyrotechnic charges for generating gaseous components of such mixture, at least one of said pyrotechnic charges being capable of self-sustained burning and at least one of said pyrotechnic charges not being capable of self-sustained burning, and
   conductive wall means for maintaining said charge capable of self-sustained burning in thermal communication with said charge not capable of self-sustained burning so that said charges burn at substantially the same linear rate.

2. A gas generator according to claim 1 wherein said means for maintaining said charges in thermal communication comprises a common wall of metal.

3. A gas generator according to claim 1 wherein the self-sustaining charge and the not self-sustaining charge are disposed concentrically with respect to one another.

4. A gas generator according to claim 1 wherein the self-sustaining charge and the not self-sustaining charge are disposed concentrically with respect to one another and are separated from each other by thermally conductive wall means.

5. A gas generator according to claim 1 further comprising:
   means forming a first cavity for containing the self-sustaining charge;
   means forming a second cavity for containing the not self-sustaining charge, said means forming said second cavity being in thermal communication with said means forming said first cavity over an extent such that heat generated by the combustion of the self-sustaining charge sustains combustion of said not self-sustaining charge so that said charges burn at substantially equal linear rates.

6. A gas generator according to claim 1 wherein said plurality of separate pyrotechnic charges comprise a first charge for generating oxygen and a second charge for generating nitrogen.

7. A gas generator according to claim 6 wherein said charge for generating oxygen is capable of self-sustained burning and said charge for generating nitrogen is not capable of self-sustained burning.

8. A gas generator according to claim 1 wherein one of said pyrotechnic charges comprises a charge for generating nitrogen.

9. A gas generator according to claim 8 wherein said charge for generating nitrogen comprises the following components in the following weight percentage ranges:

| Component | Weight Percent |
| --- | --- |
| sodium azide | 35–60% |
| iron oxide | 0.3–1.5% |
| alumina | 0.3–1.5% |
| silicon dioxide | 35–65% |
| carbon black | 0–2% |

10. A pyrotechnic gas generator for generating a mixture of at least two gases substantially in a predetermined volumetric gas ratio R at a selected rate over an extended time period, with a first pyrotechnic composition capable of sustained reaction to generate a first gas in accordance with said selected rate and a second pyrotechnic composition not capable in itself of sustained reaction to generate a second gas in accordance with said selected rate, comprising:

means forming a first cavity for containing a first charge of such first pyrotechnic composition, said first cavity providing room at one surface of such first charge to constitute a burning surface therefor;

means forming a second cavity for containing a second charge of such second pyrotechnic composition, said second cavity providing room at one surface of such second charge to constitute a burning surface therefor, said means forming the second cavity being in thermal communication with the means forming the first cavity over an extent such that the heat generated by combustion of the first charge at its burning surface, to sustain combustion of the second charge, whereby the first and second charges burn at substantially equal linear rates; such first and second charges being capable of generating their respective gases, at their respective burning temperatures, at rates of $K_1$ and $K_2$ cubic feet per unit volume of charge, and the corresponding cross sectional areas $A_1$ and $A_2$ of the first and second cavities and the respective charges contained therein at any given time during the combustion of such charges being in the ratio $A_1/A_2 = K_2R/K_1$.

11. A gas generator according to claim 10 wherein said first pyrotechnic composition capable of sustained reaction comprises a composition for generating oxygen and said second pyrotechnic composition not capable in itself of sustained reaction comprises a composition for generating nitrogen.

12. A method for generating a mixture of at least two gases substantially in a predetermined ratio, comprising the steps of:

providing a first pyrotechnic charge capable of self-sustained burning for generating at least one component of said mixture;

providing a second pyrotechnic charge not of itself capable of self-sustained burning for generating a component of said mixture;

burning said first pyrotechnic charge; and maintaining said second pyrotechnic charge in thermal communication with said first pyrotechnic charge so that said second charge burns at substantially the same linear rate as said first charge.

13. A method according to claim 12 wherein said first pyrotechnic charge is a charge for generating oxygen and said second pyrotechnic charge is a charge for generating nitrogen.

14. A method for pyrotechnically generating a mixture of at least two gases substantially in a predetermined volumetric gas ratio R at a selected rate over an extended time period, with a first pyrotechnic composition capable of sustained reaction to generate a first gas in accordance with said selected rate, and a second pyrotechnic composition not capable in itself of sustained reaction to generate a second gas in accordance with said predetermined rate, comprising:

providing a first elongated charge of a first pyrotechnic composition for generating such first gas only at one end thereof, which end constitutes a burning surface of cross-sectional area $A_1$;

providing a second elongated charge of a second pyrotechnic composition for generating such second gas only at one end thereof, which end constitutes a burning surface of cross-sectional area $A_2$, said first and second charges being axially aligned so that their respective burning surfaces remain substantially adjacent each other during combustion and being closely enough adjacent each other so that the heat of reaction of the first charge generated at its burning surfaces sustains the combustion of the second charge, whereby the first and second charges burn at substantially equal linear rates, such first and second charges being capable of generating their respective gases, at their respective burning temperatures, at rates of $K_1$ and $K_2$ cubic feet per unit volume of charge, and the adjacent corresponding cross-sectional areas $A_1$ and $A_2$ of the respective charges being in the ratio $A_1/A_2 = K_2R/K_1$.

15. A pyrotechnic gas generator for generating a breathable mixture of oxygen and nitrogen comprising:

a pyrotechnic charge for generating oxygen;

a pyrotechnic charge for generating nitrogen;

means for maintaining the oxygen charge in thermal communication with the nitrogen charge so that said charges burn at substantially the same linear rate;

means for igniting said charges;

means for mixing the gases generated by said charges; and means for filtering particulate matter from the gases generated by said charges.

16. A gas generator according to claim 15 wherein said means for maintaining said charges in thermal communication comprises thermally conductive wall means disposed between said charges.

17. A gas generator according to claim 15 wherein said oxygen charge and said nitrogen charge are disposed concentrically with respect to one another.

18. A gas generator according to claim 15 wherein said oxygen charge and said nitrogen charge are disposed concentrically with respect to one another and are separated from each other by the thermally conductive wall means.

* * * * *